United States Patent [19]

Smith

[11] 3,775,003
[45] Nov. 27, 1973

[54] MICROFORM POSITIONING CARRIER
[75] Inventor: Stephen B. Smith, Centerville, Ohio
[73] Assignee: The National Cash Register Company, Dayton, Ohio
[22] Filed: Nov. 9, 1971
[21] Appl. No.: 197,036

[52] U.S. Cl.................. 353/23, 353/27, 353/95
[51] Int. Cl.... G03b 1/48, G03b 21/11, G03b 23/08
[58] Field of Search..........353/22–24, 27, 77, 78, 95

[56] References Cited
UNITED STATES PATENTS
3,442,581   5/1969   Smitzer........................... 353/27
3,446,552   5/1969   Gross.............................. 353/27

Primary Examiner—Louis R. Prince
Assistant Examiner—A. J. Mirabito
Attorney—J. T. Cavender et al.

[57] ABSTRACT

Mechanism for automatically placing into precise position a microform in a reader for reading the microform, and for automatically positioning the microform for removal from the reader. The microform carrier has a top plate spaced from the bottom plate, the plates being slidable as a unit for positioning of the microform. The carrier includes a pair of rotatable elements movable toward and away from the top plate, each of the elements having a peripheral surface thereon wherein the frictional effect is greater between the element surface and the microform than between the microform and the top plate. The surfaces of the rotatable elements are engageable with the microform at a predetermined point in the travel of the carrier for carrying the microform into a loading or reading position, and for ejecting the microform into an unloading position. Camming means are provided along the sides of the carrier support to raise the lower plate a slight amount and maintain the microform against the top plate in one position of the carrier, and to release the lower plate in another position of the carrier.

18 Claims, 5 Drawing Figures

INVENTOR
STEPHEN B. SMITH
HIS ATTORNEYS

INVENTOR
STEPHEN B. SMITH
HIS ATTORNEYS

MICROFORM POSITIONING CARRIER

BACKGROUND OF THE INVENTION

In the microform-type readers, certain desirable features are incorporated therein which permit for faster and more accurate operation in the retrieval of information. As is well-known, a typical microform reader includes a microform carrier having an upper transparent plate pivotable from the lower plate to permit insertion and/or removal of a microform. Generally, the area of the lower plate, on which the microform is placed, is larger than the area of the microform itself so as to provide sufficient space for ease of "loading and unloading" the reader. In this respect, when a certain size microform is inserted between the plates, it is not always placed in a precise position and such placing may vary in the matter of insertion of one to another form. Additionally, when removing a microform from between the plates, it is sometimes difficult to grasp the form from the lower plate by reason of the flat or level attitude of the form in relation to the lower plate. It is, therefore, desirable that means be provided for aiding in the positioning of the microform during insertion and/or removal of the form.

In looking at the prior art, one example thereof which relates to the positioning of forms, slides or like material, is United States Pat. No. 586,245, issued on the application of H. J. Riley, which shows and describes a lantern slide carrier wherein a slide is inserted into one set of grooves in the carrier and retracted through another set of grooves. A reciprocating slide carries the frames into position into the path of light, there being a pair of frame seating arms pivotally supported and operating with a lever arm, a spring detent, and a rib to shift the frame from one to another set of the grooves.

Additionally, United States Pat. No. 3,446,552, issued on the application of M. C. Gross et al., shows and describes a microfiche reader having an upper and a lower glass plate automatically separated by a camming action, wherein a pivoted door with a lug extends into engagement with surfaces of extending arms. A pair of cranks cause cam arms to engage with legs of the plate support members and the lower plate is pivoted against the continuous bias of a pair of spring arms to facilitate insertion and removal of a microfiche from between the glass plates.

SUMMARY OF THE INVENTION

The present invention relates to microform readers and more particularly to microform carriers which are designed to position the microform for faster and more accurate operation of the reader. The microform carrier includes frictional devices which grasp the edges of the microform after a partial manual insertion or placing of the form between the plates and, upon movement of the carrier to a rearward position, automatically carry the form to the desired and accurate location. Upon removal of the microform from its "reading or loaded" position, the carrier is drawn forward and at a predetermined point in travel, the friction devices again grasp the edges of the microform to automatically eject the form from between the plates and thus position it in a location for easy removal by the operator.

The upper and lower plates are spaced from each other and provide a throat therebetween to receive the microform, the plates being movable as a unit in a fore-and-aft direction and in a side-to-side direction to effect proper positioning of a desired microimage frame in the light path for projecting an enlarged image on the screen. A pair of cam surfaces or rails are supported from the sides of the carrier and a pair of frictional devices, in the form of wheels, are positioned at the sides of the carrier near the rear thereof. The wheels are held biased against the upper plate, which plate is maintained in a secure manner, during a certain portion of travel of the carrier and engage with ejector plates therealong which aid in positioning the form for both loading and unloading. In this respect, the projection lens of the reader is maintained in continuous contact with the upper plate during all movements of the microform carrier. The characteristics of the materials used on the surface of the wheels, that of the microform itself, and that of the upper glass plate are such that the friction between the wheel surfaces and the microform is greater than the friction between the microform and the glass plate.

The microform is initially partially inserted between the plates until it makes contact with the frictional surface of the wheels, after which continued rearward movement of the carrier causes the wheels to roll across the ejector plates (also made of friction material) to grasp the form and move it to a stop position at the rear of the carrier. Additionally, at a point in travel of the carrier in a rearward direction, a pair of pressure plates which have been held at a distance away from the upper plate are biased, by means of springs, against the microform to hold it against the upper plate in a secure position for reading.

Upon moving the carrier in a forward direction, the operation of the mechanism is reversed and at a predetermined point in the travel of the carrier, the cams force the pressure plates away from the upper plate and allow the microform to be relieved therefrom. Continued forward movement of the microform carrier causes the friction wheels to again roll across the ejector plates and, due to the difference in the coefficient of friction between the surface of the wheels and of the microform and that between the microform and the upper glass plate, the microform is ejected into a position easily retrievable by the operator.

In accordance with the above discussion, the principal object of the present invention is to provide a microform carrier for a reader wherein the loading and unloading of the microform permits continuous contact of a tracking type projection lens with the upper glass or cover plate.

Another object of the present invention is to provide for automatic positioning of a microform in the loading and unloading thereof.

A further object of the present invention is to provide a microform carrier for operation in positions other than a horizontal position.

Additional advantages and features of the present invention will become apparent and fully understood from a reading of the following description taken together with the annexed drawings, in which.

Figure 1:
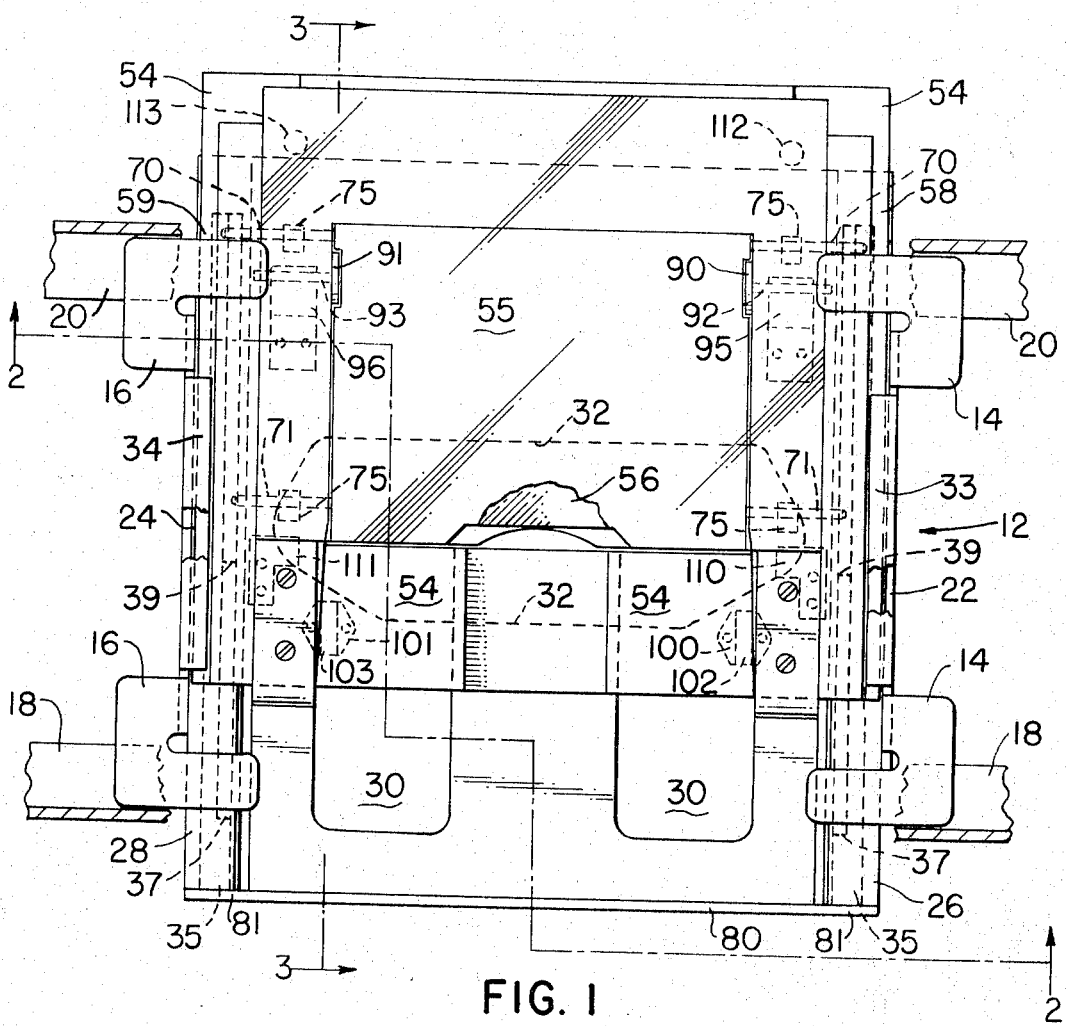
FIG. 1 is a top plan view of a microform carrier incorporating the structure of the present invention.
Figure 2:
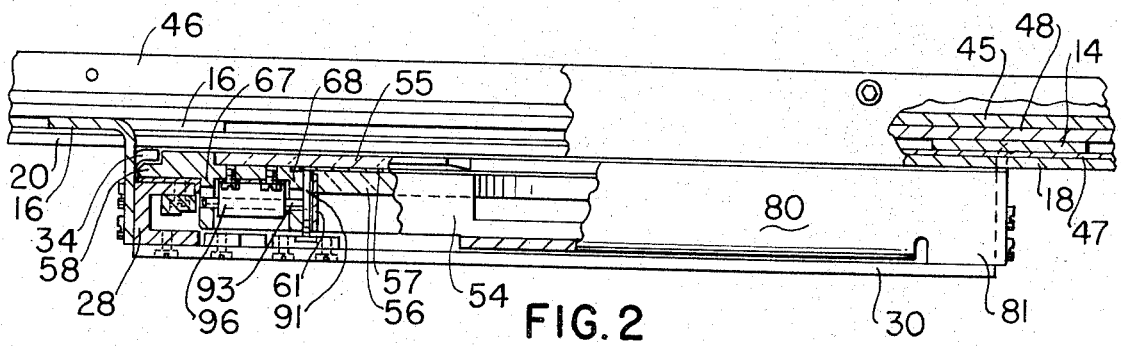
FIG. 2 is a frontal view, partially in section, taken along the line 2—2 of FIG. 1.

Referring to FIG. 1, there is shown a microform carrier, generally designated as 12, which carrier is movable in a side-to-side direction and in a fore-and-aft direction to properly position selected microimages desired to be viewed on a microform reader screen (not shown). Typical of such screen and the optical system in a microform reader is shown and described in a copending application, Ser. No. 851,858, now U.S. Pat. No. 3,634,005, in the names of A. E. Peters and L. G. Miles and assigned to the same assignee as the present invention. The carrier 12, in the instant application, is slidable in a side-to-side or right-and-left direction, by means of supporting ears 14 and 16, cooperating to be movable along rails 18 and 20. Ears 14, on the right side, are connected by an elongated portion 22 therebetween and ears 16, on the left side, are connected by a similar portion 24, both the ears and the connecting portions being secured to U-shaped side rails running in the fore-and-aft direction. The U-shaped rails 26 and 28, rail 26 being clearly shown in the sectional view of FIG. 5, have secured thereto on the lower side thereof a flat connecting plate 30, also seen in FIGS. 2, 3 and 4, and which plate has a large elongated opening 32 therein for admitting light rays from a source in the optical system (not shown) to allow the rays to pass through a selected microform image for projection onto the screen. Just above the elongated connecting portions 22, 24 are angle-shaped members 33, 34 adjustably secured to the respective U-shaped rails 26, 28 to retain the fore-and-aft directed portion of the microform carrier in an aligned and flat condition. Each of the U-shaped rails 26, 28 has a camming member on the inside of the U and which is secured to the upper leg thereof, one such camming member 35 being shown in FIG. 5. The shape of the camming member 35 is that of an elongated bar running substantially the length of the U-shaped rail 26 and having a full section portion 36 (FIG. 3), leading to a slope or incline 37, then a reduced height portion 38, leading to a second slope or incline 39, and then to a further reduced height portion 40 (FIG. 4), the purposes of which will be later explained.

Returning to the support means for the ears 14 and 16, the rails 18 and 20 are angular shaped and are spaced from each other by connecting members (not shown) at the sides thereof to form a rigid support for the microform carrier. Secured to angle rail 18 is a smaller angular member 45 (FIG. 3) with a similar member 46 secured to rail 20, there being a coating of synthetic material 47 on the upper surface of rails 18 and 20 and a coating of material 48 on the lower surface of rails 45 and 46 to provide a smooth gliding surface for the ears 14 and 16 as the carrier is moved in a side-to-side direction. Ears 14 and 16 are formed castings which project upwardly from the reduced connecting portions 22, 24, then extend outwardly and into the space between the rails 18, 45 and 20, 46, which rails provide a sliding track for the ears to support the microform carrier.

Figure 4:
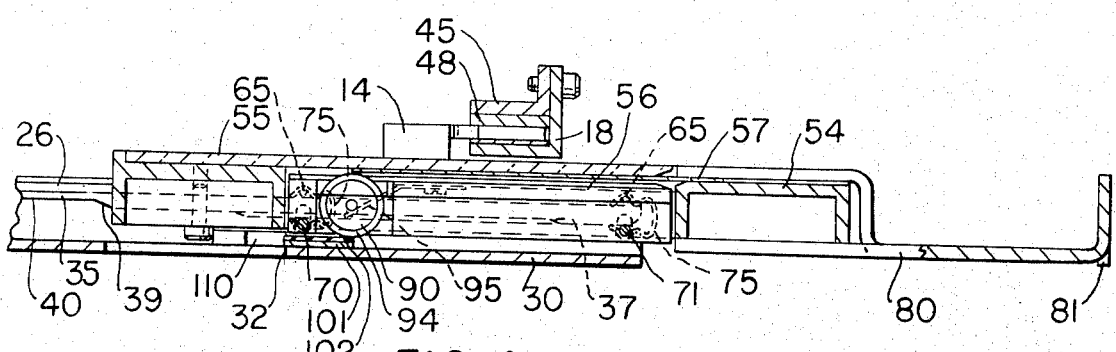
FIG. 4 is a similar view as FIG. 3, but showing the microform carrier at one stage during travel thereof to the microform loading or to the unloading position.
Figure 5:
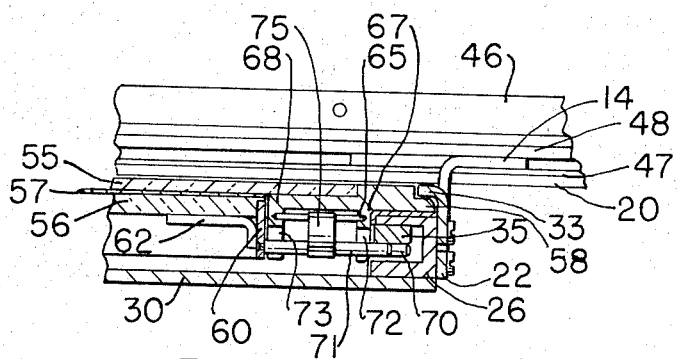
FIG. 5 is a sectional view taken on the line 5—5 of FIG. 3.

The portion of the microform carrier which is movable in the fore-and-aft direction comprises a formed casting 54 (FIGS. 1, 2, 3, and 4) which has an upper transparent plate 55 secured thereto, see also FIG. 5, and a thicker lower transparent plate 56 movable a slight amount in an up-and-down direction and fashioned to sandwich a microform 57 therebetween. The formed casting 54 has right and left hand lips 58, 59 which ride on coated surfaces of rails 26 and 28, respectively, the angle shaped members 33, 34 providing the upper side of a track for the lips 58, 59.

Since the upper plate 55 is immovable in relation to the formed casting 54, the lower plate 56 must be adapted to be lowered to enable the insertion and/or removal of a microform between the plates. The lower plate 56 has secured thereto a framework comprising a pair of straps 60, 61 (FIGS. 2 and 5) and, running along the right and the left side of the plate 56, and four corner pieces, typical of which is piece 62, seen in FIG. 5, to secure the straps 60, 61 and a rear connecting strap.

Figure 3:
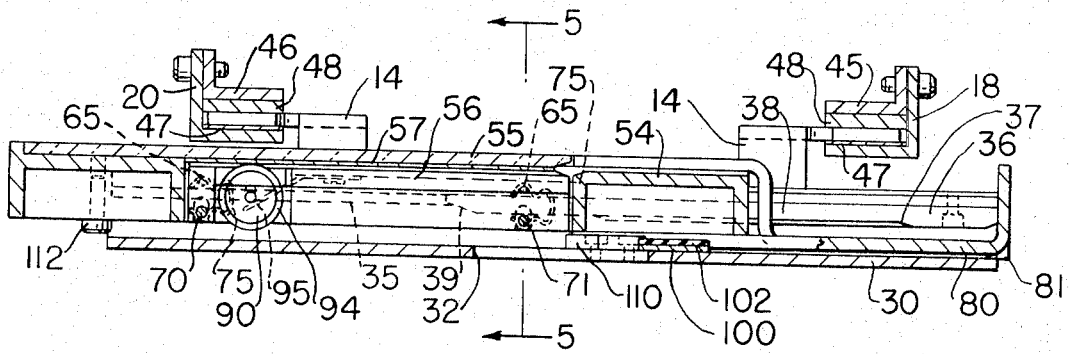
FIG. 3 is an elevational view, partially in section, taken along the line 3—3 of FIG. 1, and showing the microform carrier in a microform viewing position.

A plurality of pins 65, four in number, are secured to the casting 54, two on each side of the lower plate 56 and extending between casting ribs 67 and 68, as seen in FIG. 5, there being two pins similarly located at the left side of the lower plate 56 and extending between like casting ribs on the right side. Since the construction of these ribs and the pertinent parts associated therewith are alike, only the right side, as seen in FIGS. 3, 4 and 5 will be further explained. Directly below each of the pins 65 is a large pin, the rearward pin 70 being longer than the forward pin 71 (FIGS. 1 and 5) and positioned to move in an up-and-down direction in slots 72, 73 in the lower portion of the ribs 67, 68 (FIG. 5). Connecting each of the small pins 65 and the larger pin 70, or 71, whether referring to the front or the rear pin, is a leaf spring 75 which exerts pressure on the lower plate 56 in an upward direction at all times. The effect of the springs is to maintain minimum distance between the small pins 65 and the larger pins 70, 71 and thereby tend to maintain the lower plate 56 upward against the cover plate 55. Downward pressure on the pins 70, 71 moves the lower plate 56 away from the cover plate 55 to enable insertion and/or removal of a microform 57.

Connected to the frontal portion of the casting 54 is a handle 80 for moving the microform carrier in the desired directions, the handle having out-standing portions 81 at each end of the frontal portion of the handle to engage with the front surface of the U-shaped rails 26, 28 when the carrier is in a rearmost position, wherein the microform is properly placed for reading.

Since the nature of the present invention concerns itself substantially with the fore-and-aft movement of the microform carrier 12 and the structure for insertion and positioning of a microform 57 between the transparent plates 55, 56 and, thereafter the positioning of the microform for removal thereof, there is provided means for so positioning the microform in its correct and proper attitude for rapid operation of the reader. As seen in FIG. 1, a pair of wheels 90, 91, (see FIGS. 3 and 4 for an elevational view of wheel 90), are carried by means of shafts 92, 93 journally supported in elongated apertures in the ribs 67, 68 of the casting 54, the wheels being positioned in cutout portions of the bars 60, 61 so as to be independent thereof and freely movable a limited amount in the up-and-down direction. Wheels 90, 91 have a tread 94 of silastic or like silicone rubber material on the periphery thereof for a purpose to be described. A pair of leaf springs 95, 96 are secured to the casting 54 between the ribs 67, 68, the springs exerting a continuous bias against the shafts 92, 93 to maintain the wheels 90, 91 in an upward direction, as seen in FIGS. 3 and 4 for wheel 90. Secured to the plate 30 on the upper side thereof and located in the path of wheels 90, 91 are a pair of hexagonally shaped pressure plates 100, 101 having strips of silastic or like silicone rubber material 102, 103 fixed thereto and positioned to be engageable by the tread of wheels 90, 91 during the course of travel in the fore-and-aft movement of the carrier 12. The purpose of the silastic or like rubber material on the tread 94 of the wheels 90, 91 and on the central portions 102, 103 of pressure plates 100, 101 is to provide the certainty of a rolling motion of the wheels during a portion of the fore-and-aft travel of the microform carrier and additionally to develop a high degree of friction between the tread on the wheels and the surface of the microform during this portion of the cycle of insertion and/or removal of the microform. Forward stop means of the carrier are also provided by a pair of L-shaped plates 110, 111 (FIG. 1) secured to the plate 30 just to the rear of the pressure plates 100, 101 and engageable by screws 112, 113 when the handle 80 is pulled to the front position. The carrier 12 is thus controlled in its fore-and-aft travel by the portions 81 of handle 80 striking the forward ends of the U-shaped rails 26, and by the engagement of screws 112, 113 with plates 110, 111.

In the operation of the microform carrier, the fore-and-aft slidable portion of the carrier 12 is assumed to be in a rearward position as seen in FIG. 3, and ready to be pulled to its forward position for inserting a microform 57 between the upper 55 and lower 56 transparent plates. In the rearward position the wheels 90, 91 are held in contact, by means of the leaf springs 95, 96, with the lower surface of the upper plate 55, the lower plate 56 having cut out portions so as to be free of the wheels. Additionally the lower plate 56 is biased upwardly against the upper plate 55 by means of the leaf springs 75 which are fashioned to permit separation of the plates by exertion on the pins 70, 71 in the downward direction. Such exertion is accomplished by contact of the pins with the camming portions of members 35, which are secured to the inside surface of the upper leg of the U-shaped rails 26. As seen in FIGS. 1 and 5, pins 70 are longer than and extend farther toward the sides of the carrier than do the pins 71, this structure being cooperable with the slopes or inclines 37, 39 (FIG. 3) on the camming members 35.

Upon being pulled forward, the wheels 90, 91, and the pins 70, 71 on each side of the transparent plate 56 travel forward with the fore-and-aft portion of the carrier, the pins 70, 71 riding along the surface of the camming members 35 in a smooth and level plane with the lower plate 56 being biased against the upper plate 55 by the leaf springs 75. When the pins 71 reach incline 37, and when the pins 70 reach incline 39, wheels 90, 91 reach the edge of the pressure plates 100, 101 and start to ride thereacross, these three actions occurring simultaneously to exert a downward force on the lower plate 56 to separate it from the upper plate 55. The wheels 90, 91 roll across the silastic portions 102, 103 to the forward side thereof and the pins 70, 71 ride on the thicker portions of the camming members 35 to thereby separate the plates 55 and 56. The carrier is now ready for the insertion of a microform which is easily placed between the separated plates 55, 56 and is pushed rearward therebetween until the rear edges thereof make contact with the silastic tread 94 of the wheels 90, 91 whereupon a pushing of the carrier in the rearward direction causes a grasping of the microform by the silastic treads and carries the microform rearward into a precise position. At the same time that the wheels 90, 91 leave the pressure plates and travel in the rearward direction, the pins 70, 71 are released from the cammed portions of members 35 to freely glide along the members, and the action of leaf springs 75 on the pins 70, 71 and 65 brings the lower plate 56 to bear against the upper plate 55, thereby capturing the microform between the plates and in the precise position for reading.

When it is desired to remove the microform 57 from the carrier 12, the handle 80 is pulled forward and again when the wheels 90, 91 reach the pressure plates 100, 101, the pins 70, 71 reach the inclines 37, 39, respectively, to separate the plates and thereby allow removal of the microform. Additionally, the silastic tread 94 of the wheels 90, 91 grasps the microform 57 upon traveling across the silastic portions 102, 103 and drives the microform forward into a position for easy removal thereof. It is by virtue of the differences in the coefficients of friction that the wheels 90, 91 and pressure plates 100, 101 are able to drive the microform 57 into position for viewing thereof and also into position for removing it from the carrier. The coefficient of friction between the silastic tread 94 and the microform 57 is greater than the coefficient of friction between the microform and the glass plate 55 so the microform is driven by the wheels into the desired position.

It is thus seen that herein shown and described is a microform positioning mechanism which operates to automatically open the lower glass plate of a microform carrier for insertion and/or removal of a microform and to automatically close the lower plate of the carrier when the form is properly inserted therein and to retain the form in a precise position. Additionally, the wheels in conjunction with the pressure plates enable the driving of the microform into a precise position for viewing thereof and into a precise position for removal of the form. The mechanism enables the accomplishment of the objects and advantages mentioned above and while only one embodiment of the invention has been disclosed herein, certain variations may occur to those skilled in the art, and it is contemplated that all such variations, not departing from the spirit and scope of the invention hereof, are to be construed in accordance with the following claims.

What is claimed is:

1. Means for positioning record material in a carrier having an upper and a lower plate with the record material being contained therebetween, and said carrier having a stationary portion and a movable portion in relation thereto, said means for positioning comprising:

means secured to the stationary portion and having a frictional surface different from that of the record material, and means connected to the movable portion engageable with the means secured to the stationary portion and with the record material and having a frictional surface different from that of said record material, said connected means contacting said means secured to the stationary portion and said record material upon movement of said movable portion to move the record material by reason of the greater coefficient of friction between the surface of the connected means and the record material than the coefficient of friction between the record material and the upper plate.

2. The subject matter of claim 1 wherein the means secured to the stationary portion are frictional members in the path of the means connected to the movable portion and positioned to urge said connected means against said record material for movement thereof in relation to said upper plate.

3. The subject matter of claim 1 wherein the means connected to the movable portion are rolling members urged against said record material upon contact with the means secured to the stationary portion for moving the record material.

4. The subject matter of claim 2 wherein the means connected to the movable portion are wheels rotatable upon contact with said frictional members to move the record material.

5. The subject matter of claim 3 wherein the means secured to the stationary portion are pressure pads contactable by said rolling members for moving said record material.

6. The subject matter of claim 4 including spring means biasing said rolling members into engagement with said upper plate during travel of the movable portion.

7. The subject matter of claim 1 wherein the carrier includes camming means for separating the lower and upper plates in one position of the movable portion to facilitate insertion of said record material therebetween.

8. The subject matter of claim 1 wherein the carrier includes camming means for permitting juxtaposed relationship of said lower and upper plates in one position of the movable portion to retain said record material in position.

9. Mechanism for positioning record material in and for ejecting record material from a material carrier having a stationary portion and a movable portion in relation thereto, and said movable portion having an upper and a lower transparent plate for carrying the record material therebetween, said mechanism comprising:
frictional means secured to the stationary portion, and frictional means connected to the movable portion and engageable with the first mentioned frictional means during travel of the movable means in one direction to carry the record material into proper position for recording thereof and engageable with the first-mentioned frictional means during travel of the movable means in the other direction to carry the record material into position for removal thereof, said record material being propelled into one or the other position upon contact by the second-mentioned frictional means with the first-mentioned frictional means and by reason of the greater coefficient of friction between the second-mentioned frictional means and the record material than the coefficient of friction between the record material and the upper plate.

10. The mechanism of claim 9 wherein the first-mentioned frictional means comprise a pair of plates and the second-mentioned frictional means comprise a pair of rollable members urged against the record material to propel said material in the direction of travel of the movable portion.

11. The mechanism of claim 10 including spring means biasing said rollable members into engagement with said record material during travel of the movable portion.

12. The mechanism of claim 9 including camming means for permitting juxtaposed relationship of said upper and lower plates in one position of the movable portion to retain said record material in recording position.

13. The mechanism of claim 9 including camming means for separating the upper and lower plates in one position of the movable portion to permit removal of the record material therefrom.

14. The mechanism of claim 9 including spring means connected for exerting pressure on the lower plate throughout the extent of travel of the movable portion.

15. In a microform reader, a microform carrier having a portion movable in a side-to-side direction and a portion movable in a fore-and-aft direction, said fore-and-aft movable portion carrying an upper and a lower transparent plate for containing the microform therebetween, and means for positioning the microform in precise manner comprising: frictional means secured to the side-to-side movable portion, and frictional means connected to the fore-and-aft movable portion and engageable with the first-mentioned frictional means upon movement of the fore-and-aft movable portion, said second-mentioned frictional means being engageable with the microform to direct the microform into precise position upon engagement of the second-mentioned frictional means and movement thereof with respect to the first-mentioned frictional means by reason of greater coefficient of friction between the second-mentioned frictional means and the microform than the coefficient of friction between the microform and the upper transparent plate.

16. In the reader of claim 15 wherein the first-mentioned frictional means comprise a pair of plates and the second-mentioned frictional means comprise a pair of rollable members positioned in the path of the plates and urged against the upper plate upon engagement of the rollable members with the plates to carry the microform into said precise position.

17. In the reader of claim 15 including camming means for permitting juxtaposing of the upper and lower plates for enabling secure containment of the microform upon movement of the fore-and-aft movable portion in one direction to the precise position.

18. In the reader of claim 15 including camming means for separating the upper and lower plates enabling removal of the microform from therebetween upon movement of the fore-and-aft movable portion.

* * * * *